(12) United States Patent  (10) Patent No.:  US 7,213,864 B2
Gasper  (45) Date of Patent:  May 8, 2007

(54) SOFT CAB GOLF CART SEAT-ANCHORED ENCLOSURE

(75) Inventor: Joseph J. Gasper, Gainesville, FL (US)

(73) Assignee: Annwil, Inc., Tampa, FL (US)

( * ) Notice: Subject to any disclaimer, the term of this patent is extended or adjusted under 35 U.S.C. 154(b) by 88 days.

(21) Appl. No.: 11/000,273

(22) Filed: Nov. 30, 2004

(65) Prior Publication Data

US 2006/0113817 A1  Jun. 1, 2006

(51) Int. Cl.
 *B60J 11/04* (2006.01)
(52) U.S. Cl. ............................ 296/83; 296/79; 296/144
(58) Field of Classification Search .................. 296/79, 296/80, 82, 83, 145, 144; 135/88.09; 280/DIG. 5
See application file for complete search history.

(56) References Cited

U.S. PATENT DOCUMENTS

| 4,098,536 | A | * | 7/1978 | Mills ..................... 280/DIG. 5 |
| 4,332,415 | A | | 6/1982 | Williams |
| 4,773,694 | A | | 9/1988 | Gerber |
| 5,217,275 | A | * | 6/1993 | Ridge ....................... 296/77.1 |
| 5,259,656 | A | | 11/1993 | Carroll |
| 5,588,690 | A | | 12/1996 | Showalter |
| 5,788,317 | A | | 8/1998 | Nation |
| 5,921,609 | A | | 7/1999 | Mills et al. |
| 6,206,447 | B1 | | 3/2001 | Nation |
| 6,497,444 | B1 | * | 12/2002 | Simon ......................... 296/83 |
| 6,916,059 | B2 | * | 7/2005 | Feinberg ...................... 296/79 |
| 2002/0096906 | A1 | * | 7/2002 | Tyrer ............................ 296/79 |
| 2004/0007894 | A1 | * | 1/2004 | Hamm ........................ 296/79 |

* cited by examiner

*Primary Examiner*—Jason Morrow
(74) *Attorney, Agent, or Firm*—The Livingston Firm; Edward M. Livingston; Angela M. Miller

(57) ABSTRACT

A soft cab enclosure. The enclosure may have an over-the-top cover (1) and flexible and transparent panels (15, 16, 17) on side and back portions. The cover (1) may include a tarpaulin having a windshield-overhang pocket (2) and having a cover-top back with back-post straps (12, 14). Linearly, the cover (1) is articulated to fit snugly intermediate a windshield top (10) and a back portion of a golf cart (9) with the windshield-overhang pocket (2) engaging the windshield top (10), the back portions of the cover (1) being strapped onto back posts (11) and (13) of the golf cart (9) with the back-post straps (12) and (14) and with a transparent, zippered access back-end panel (17) which has a left-back window panel (36) having a left anchor flap (54) under a left seat (55) and a right-back window panel (46) having a right anchor flap (56) under a right seat (57) to eliminate a need for marring attachment to a side of a golf cart. An aft access flap (50) allows ease of access to golfing items through a double zipper (52), a left-pocket bay (68) and a right-pocket bay (70).

34 Claims, 4 Drawing Sheets

SOFT CAB GOLF CART SEAT-ANCHORED ENCLOSURE

BACKGROUND OF THE INVENTION

This invention relates to enclosures for vehicles, including golf carts. Numerous enclosures for generally open-sided golf carts are known. None are known, however, to enclose both sides of a golf cart with an enclosure that is anchored between under-seat flaps.

The known related prior art includes the following:

| Number | Inventor | Issue/Disclosure Date |
| --- | --- | --- |
| U.S. Pat. No. 4,332,415 | Williams | June 1982 |
| U.S. Pat. No. 4,773,694 | Gerber | September 1988 |
| U.S. Pat. No. 5,217,275 | Ridge | June 1993 |
| U.S. Pat. No. 5,259,656 | Carroll | November 1993 |
| U.S. Pat. No. 5,588,690 | Showalter | December 1996 |
| U.S. Pat. No. 5,788,317 | Nation | August 1998 |
| U.S. Pat. No. 5,921,609 | Mills et al. | July 1999 |
| U.S. Pat. No. 6,206,447 | Nation | March 2001 |

SUMMARY OF THE INVENTION

Objects of patentable novelty and utility taught by this invention are to provide a soft-cab golf-cart enclosure which:

is affixable reliably, firmly, easily and removably under a seat of a golf cart without attachment alteration, marring or adding of attachment components to the golf cart; and has flexible and transparent doors and back which can be opened and closed easily and conveniently for access to golfing items and which are secured under the seat of the golf cart.

This invention accomplishes these and other objectives with a soft-cab golf-cart enclosure having roll-up flexible and transparent panels on side and back portions. The cover may include a tarpaulin having a cover front with a windshield-overhang pocket and having a cover back with back-post straps. In a preferred embodiment, the cover is articulated to fit snugly intermediate the windshield overhang and a back portion of the golf cart with the windshield-overhang pocket engaging the windshield overhang, with the back portions of the over-the-top cover being strapped onto back posts of the golf cart with the back-post straps and with a transparent, zippered access back window. The cover is articulated to fit snugly intermediate sides of the golf cart with roll-up flexible and transparent side panels overhanging the sides of the golf cart. The roll-up flexible and transparent side panels on both sides include a flexible and transparent front-corner panel that has a top edge affixed to the top and is zipper-attachable to a front-side post of the golf cart and zipper-attachable to a flexible and transparent side door when not rolled up. The roll-up flexible and transparent side panels each include the flexible and transparent side door that is affixed to the top of the golf cart and zipper-attachable to the front-corner panel and to a flexible and transparent back-corner panel when not rolled up. The roll-up flexible and transparent side panels each include the flexible and transparent back-corner panel that is affixed to the top and zipper-attachable to the flexible and transparent side door and to the flexible and transparent, zippered access back window when not rolled up. A bottom portion of a back window is designed to fit under a golf-cart seat for a lateral anchor of the enclosure.

BRIEF DESCRIPTION OF DRAWINGS

This invention is described by appended claims in relation to description of a preferred embodiment with reference to the following drawings which are explained briefly as follows:

DESCRIPTION OF PREFERRED EMBODIMENT

A description of a preferred embodiment of this invention is preceded by a following list of numbered items which designate the same features with the same numbers on the drawings and throughout this description and the claims.

| | |
| --- | --- |
| 1. | Over-the-top cover |
| 2. | Windshield-overhang pocket |
| 3. | Back-post straps |
| 4. | Cart-top front |
| 5. | Cart-top back |
| 6. | Left top side |
| 7. | Right top side |
| 8. | Cart top |
| 9. | Golf cart |
| 10. | Windshield top |
| 11. | Back-left-post top |
| 12. | Left back straps |
| 13. | Back-right-post top |
| 14. | Right back straps |
| 15. | Left-side panels |
| 16. | Right-side panels |
| 17. | Back-end panel |
| 18. | Left-front panel fastener |
| 19. | Left-front post |
| 20. | Right-front panel fastener |
| 21. | Right-front post |
| 22. | Left flap fastener |
| 23. | Right flap fastener |
| 24. | Hook fasteners |
| 25. | Hook and loop fastening |
| 26. | Snaps |
| 27. | Zippers |
| 28. | Roll-fastener straps |
| 29. | Zipper handles |
| 30. | Left-front-corner panel |
| 31. | Front-left-post side |
| 32. | Left-door-panel side |
| 33. | Left-door panel |
| 34. | Left-corner-panel side |

-continued

| | |
|---|---|
| 35. | Left-back-window side |
| 36. | Left-back-window panel |
| 37. | Left-door-panel side |
| 38. | Left-back-panel side |
| 39. | Left-window side |
| 40. | Right-front-corner panel |
| 41. | Front-fight-post side |
| 42. | Right-door-panel front side |
| 43. | Right-door panel |
| 44. | Right-corner-panel side |
| 45. | Right-back-window side |
| 46. | Right-back-window panel |
| 47. | Right-door-panel back side |
| 48. | Right-back-panel side |
| 49. | Right-window side |
| 50. | Access flap |
| 51. | Items |
| 52. | Double zipper |
| 53. | Stiffener members |
| 54. | Left anchor flap |
| 55. | Left seat |
| 56. | Right anchor flap |
| 57. | Right seat |
| 58. | Tarpaulin bottoms |
| 59. | Bottom ends |
| 60. | Cart-seat heights |
| 61. | Cover overhangs |
| 62. | Overhang-fastener members |
| 63. | Strap-fastener members |
| 64. | Golf clubs |
| 65. | Left golf bag |
| 66. | Right golf bag |
| 67. | Left golf-bag pocket |
| 68. | Left-pocket bay |
| 69. | Right golf-bag pocket |
| 70. | Right-pocket bay |
| 71. | Windshield |
| 72. | Panel roll |

Figure 1:
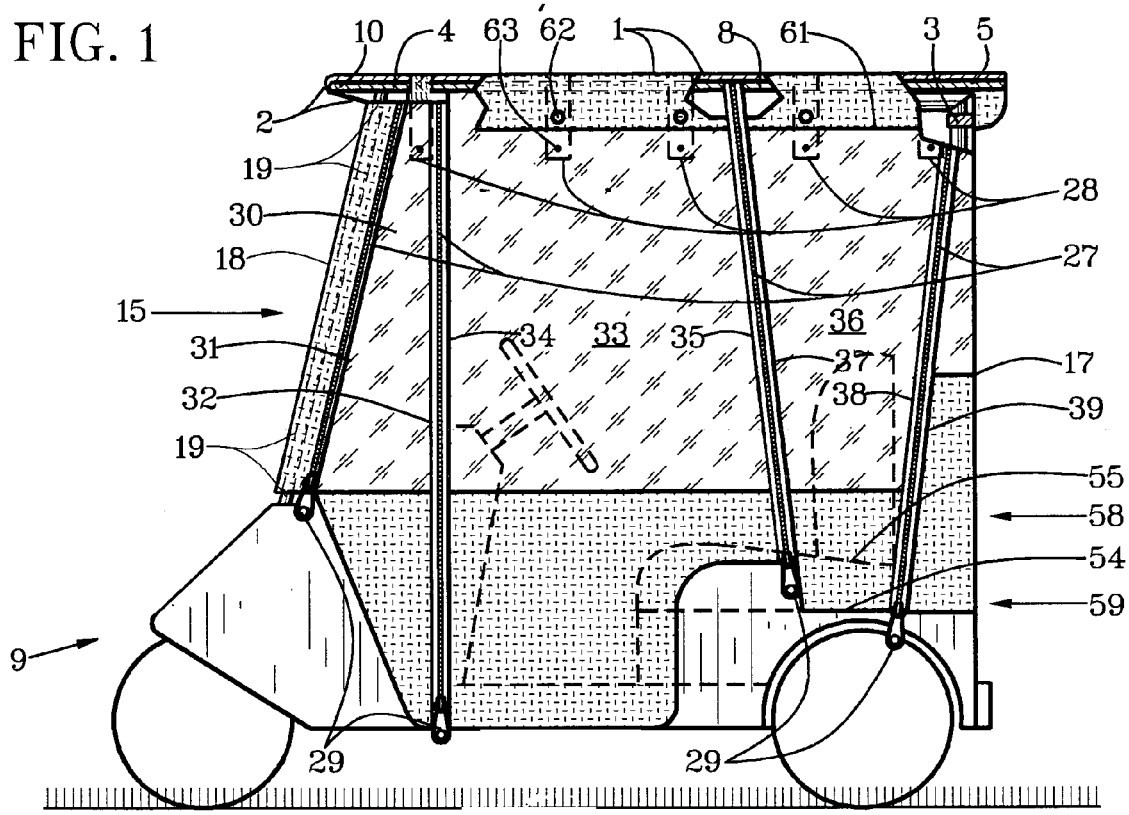
FIG. 1 is a partially cutaway left-side view of a soft-cab golf-cart seat-anchored enclosure on a typical golf cart.
Figure 2:
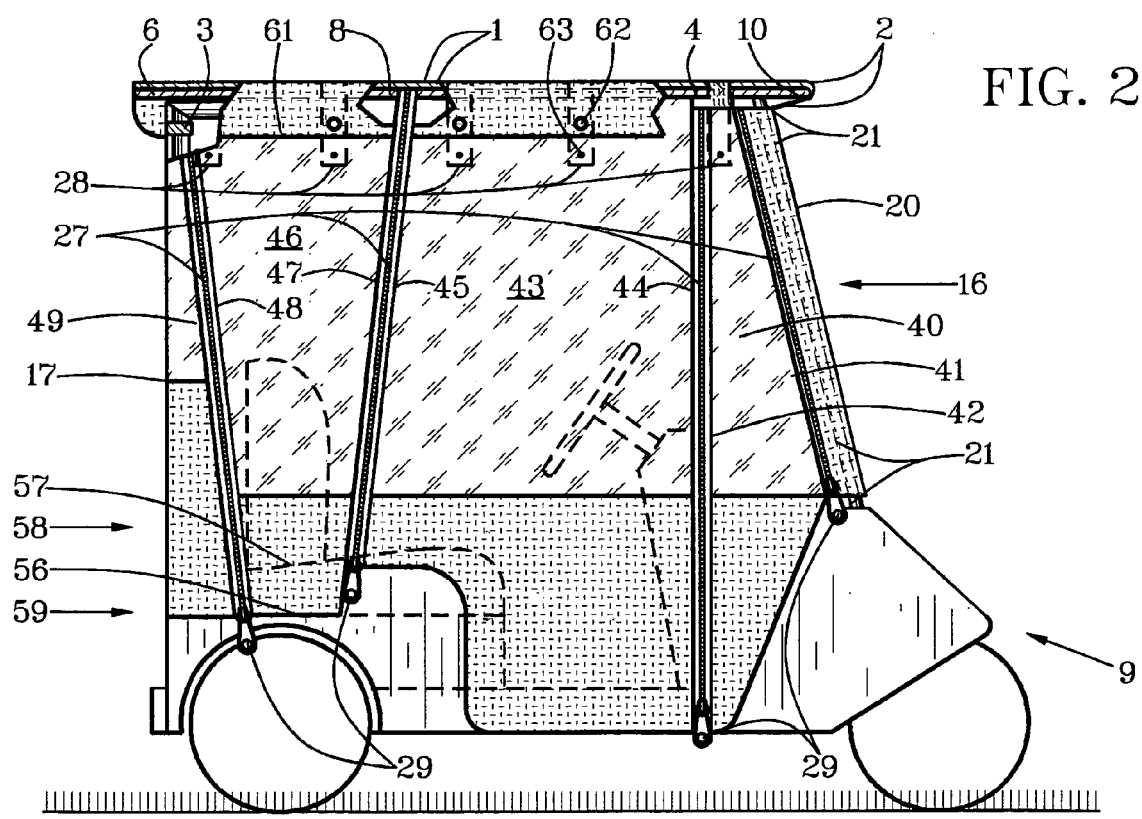
FIG. 2 is a partially cutaway right-side view of the soft-cab golf-cart enclosure on the typical golf cart.
Figure 3:
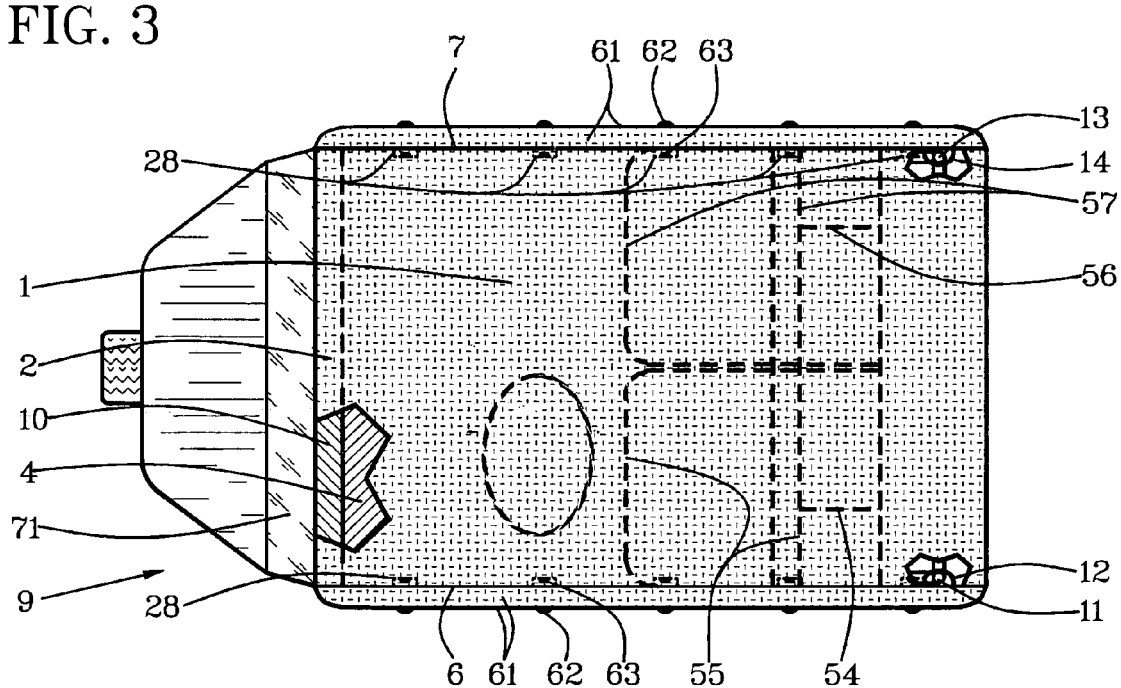
FIG. 3 is a partially cutaway top view of the soft-cab golf-cart enclosure on the typical golf cart.
Figure 4:
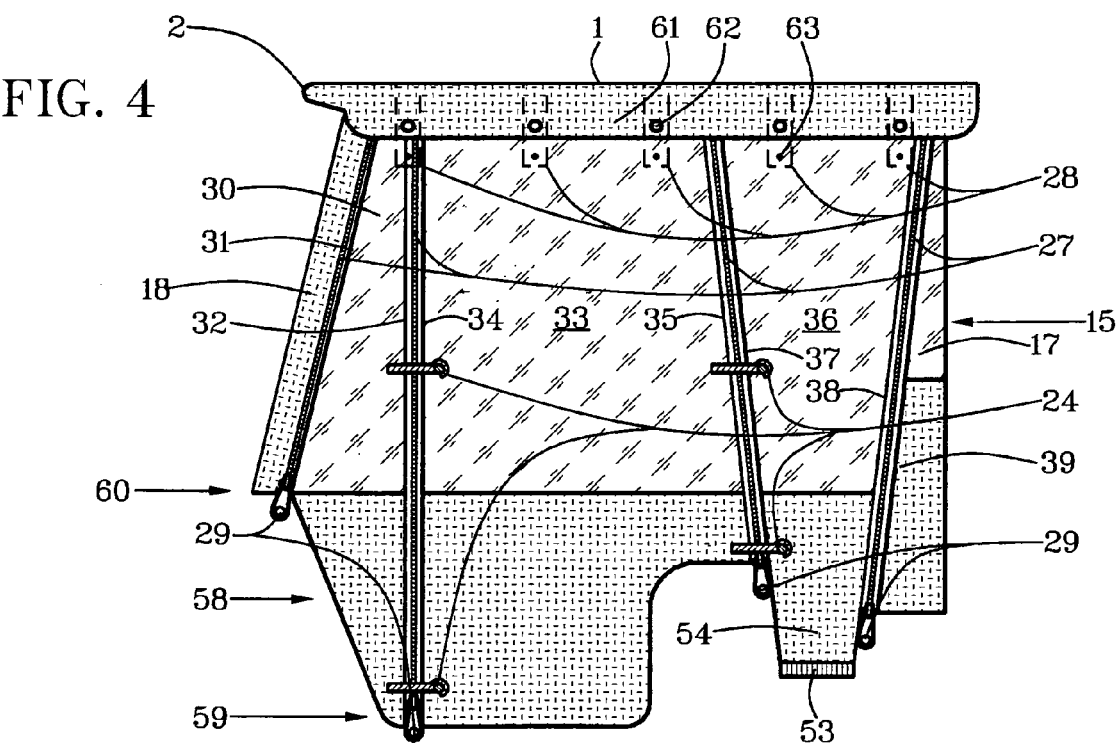
FIG. 4 is a left-side view of the soft-cab golf-cart enclosure having hook joiners in addition to zipper joiners of panels.
Figure 5:
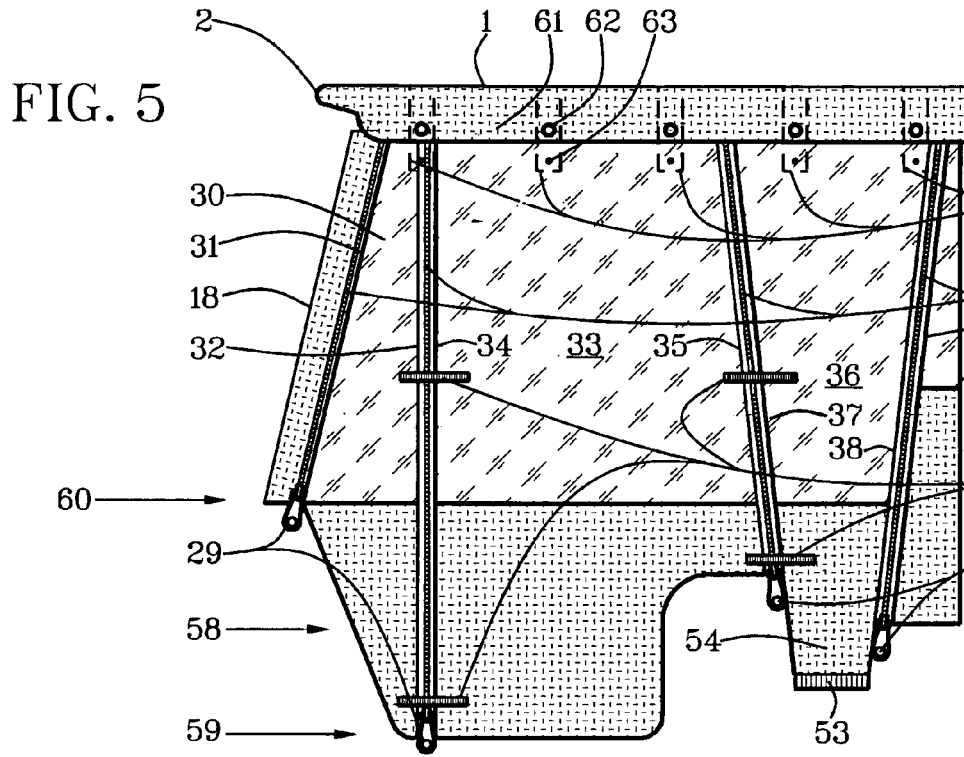
FIG. 5 is a left-side view of the soft-cab golf-cart enclosure having Velcro® joiners in addition to zipper joiners of panels.
Figure 6:
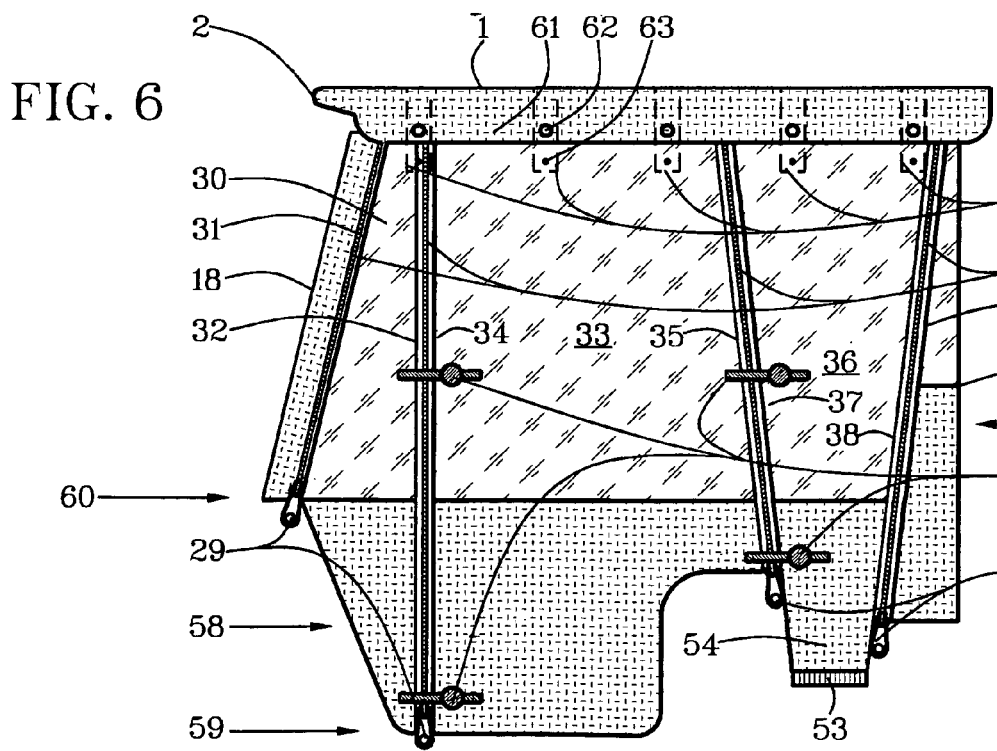
FIG. 6 is a left-side view of the soft-cab golf-cart enclosure having snap joiners in addition to zipper joiners of panels.

Referring to FIGS. 1–3, a soft-cab golf-cart enclosure has an over-the-top cover 1 with a windshield-overhang pocket 2 on a bottom side of cover front and back-post straps 3 on a bottom side of a cover back proximate oppositely disposed back corners of the over-the-top cover 1. The cover 1 is articulated to fit linearly intermediate a cart-top front 4 and a cart-top back 5 and to fit laterally intermediate a left top side 6 and a right top side 7 of a cart top 8 of a predetermined golf cart 9.

The over-the-top cover 1 can be anchored firmly against travel horizontally by a combination of transverse engagement of the windshield-overhang pocket 2 with a windshield top 10 of a windshield 71 on the golf cart 9, back attachment of the over-the-top cover 1 to a back-left-post top 11 with left back straps 12 and back attachment of the over-the-top cover 1 to a back right-post top 13 with right back straps 14.

A plurality of flexible and transparent left-side panels 15 have side-panel tops affixed to the over-the-top cover 1 proximate the left top side 6 of the over-the-top cover 1. A plurality of flexible and transparent right-side panels 16 have side-panel tops affixed to the over-the-top cover 1 proximate the right top side 7 of the over-the-top cover 1. A flexible and transparent back-end panel 17 has a back-panel top affixed to the cart-top back 5 of the over-the-top cover 1. Although the drawing figures illustrate an enclosure having an over-the-top cover 1, the over-the-top cover 1 may be eliminated in which case the panels 15, 16 and 17 may be secured to the cart top 8.

A left-front panel fastener 18 is affixable to a left-front post 19 of the golf cart 9. A right-front panel fastener 20 is affixable to a right-front post 21 of the golf cart 9.

Referring to FIGS. 1–6, for joining the panels vertically, panel joiners are positioned intermediate adjacent edges of adjacent flexible and transparent left-side panels 15, intermediate adjacent edges of flexible and transparent right-side panels 16 and adjacent edges of the flexible and transparent back-end panel 17 which are adjacent to the flexible and transparent left-side panels 15 and the flexible and transparent right-side panels 16.

The panel joiners can include a selection of fasteners selected from a class of fasteners that includes hook fasteners 24, hook and loop fastening material 25, snaps 26 and zippers 27. The zippers 27 are preferable.

All of the panel joiners are preferably articulated for oppositely disposed operation from either inside or outside of the golf cart 9 by being operable from either side of either of the panel joiners. Similarly to oppositely disposed door knobs, the hook fasteners 24 can include oppositely disposed hook knobs. The zippers 27 can include well-known oppositely disposed operation with zipper handles 29 on opposite sides.

One or more of the selection of fasteners can be employed as spot fasteners in combination with the zippers 27 that are full-length joiners. The selection of the panel joiners can be positioned at predetermined spots for quick opening and closing when it may not be convenient or desirable to open and close full-length zippers 27. Spot fastening may be preferred by some users for quick, partial opening and closing temporarily while full-length opening and closing with the zipper 27 is being achieved in particularly wet conditions that occur most frequently when dedicated and brave golf enthusiasts chance the weather.

The flexible and transparent left-side panels 15, the flexible and transparent right-side panels 16 and the flexible and transparent back-end panels 17 are rollable up to, fastened with, unfastenable from and unrollable down from roll-fastener straps 28 proximate panel tops thereof selectively.

The flexible and transparent left-side panels 15, the flexible and transparent right-side panels 16 and the flexible and transparent back-end panel 17 can include tarpaulin bottoms 58 intermediate bottom ends 59 thereof and predeterminedly proximate cart-seat heights 60 vertically above the bottom ends 59.

The tarpaulin for the over-the-top cover 1, for the left-side panels 15, for the right-side panels 16 and for the back-end panel 17 can include a wide selection of flexible materials that are preferably leak-proof, easily cleanable, reasonably light-weight and yet tough. Tarpaulin portions are shown with small decking symbolism.

Transparent portions of the left-side panels 15, the right-side panels 16 and the back-end panel 17 can include a wide selection of transparent plastic material. The transparent portions are shown with glass symbolism that is slanted oppositely from glass symbolism that is shown for a glass front windshield 71.

The flexible and transparent left-side panels 15 can include a left-front-corner panel 30 having a front-left-post side 31 that is articulated for being fastened to the left-front post 19 and has a left-door-panel side 32 that is articulated for being fastened to a flexible and transparent left-door panel 33.

The flexible and transparent left-side panels 15 can include the flexible and transparent left-door panel 33 having a left-corner-panel side 34 that is articulated for being fastened to the left-front-corner panel 30 and has a left-back-window side 35 that is articulated for being fastened to a left-back-window panel 36.

The flexible and transparent left-side panels 15 can include the flexible and transparent left-back-window panel 36 having a left-door-panel side 37 that is articulated for being fastened to the flexible and transparent left-door panel 33 and has a left-back-panel side 38 that is articulated for being fastened to a left-window side 39 of the flexible and transparent back-end panel 17.

The flexible and transparent right-side panels 16 can include a right-front-corner panel 40 having a front-right-post side 41 that is articulated for being fastened to the right-front post 21 and has a right-door-panel front side 42 that is articulated for being fastened to a flexible and transparent right-door panel 43.

The flexible and transparent right-side panels 16 can include the flexible and transparent right-door panel 43 having a right-corner-panel side 44 that is articulated for being fastened to the right-front-corner panel 40 and has a right-back-window side 45 that is articulated for being fastened to a right-back-window panel 46.

The flexible and transparent right-side panels 16 can include the flexible and transparent right-back-window panel 46 having a right-door-panel back side 47 that is articulated for being fastened to the flexible and transparent right-door panel 43 and has a right-back-panel side 48 that is articulated for being fastened to a right-window side 49 of the flexible and transparent back-end panel 17.

The flexible and transparent left-side panels 15, the flexible and transparent right-side panels 16 and the flexible and transparent back-end panels 17 are rollable up to, fastenable with, unfastenable from and unrollable down from roll-fastener straps 28 proximate panel tops thereof selectively.

The over-the-top cover 1 can include cover overhangs 61 proximate the left top side 6, proximate the right top side 7 and proximate the cart-top back 5. The cover overhangs 61 are articulated to overhang top ends of the left-side panels 15, the right-side panels 16 and the back-end panel 17.

Figure 7:
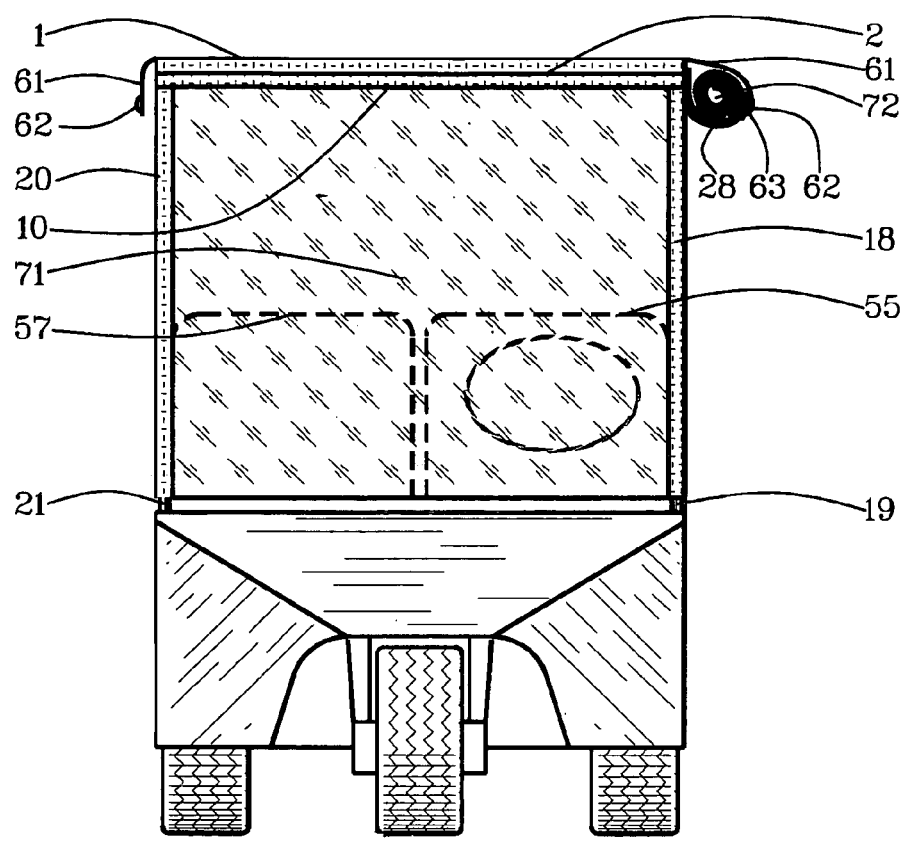
FIG. 7 is a front view of the typical golf cart having on it a soft-cab golf-cart enclosure showing a windshield pocket on a cart windshield and showing left-side panels rolled up.
Figure 8:
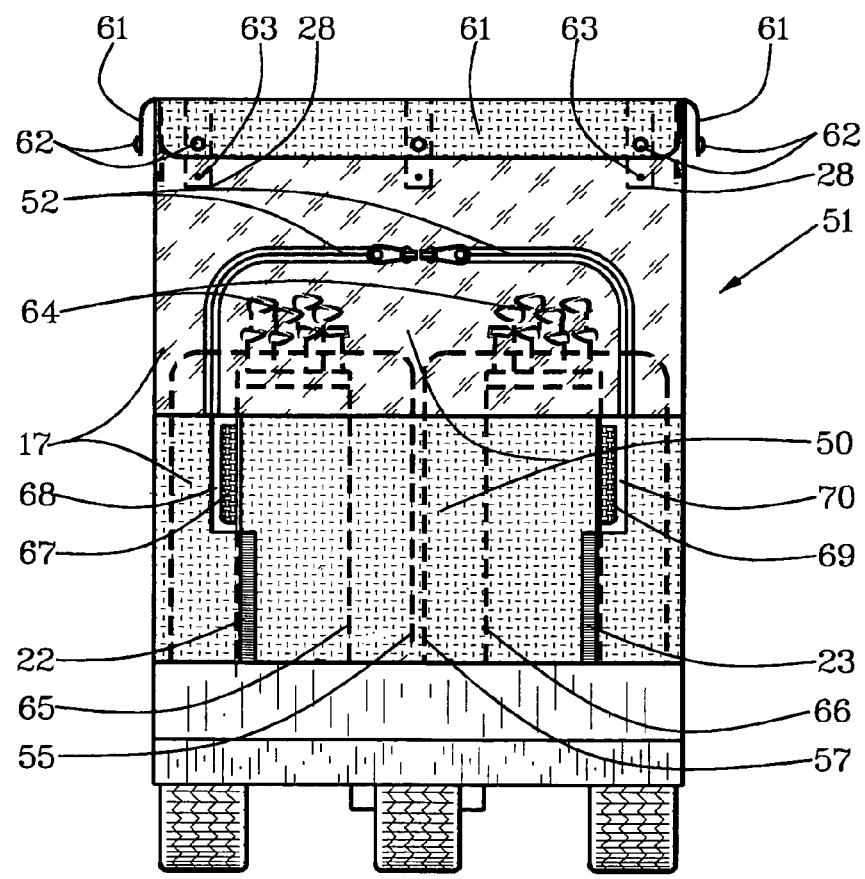
FIG. 8 is an aft view of the typical golf cart having on it the soft-cab golf-cart enclosure showing accessibleness of features of a back panel to golf bags and to golfing items in the golf bags.

The cover overhangs 61 can include overhang-fastener members 62 which are articulated for being engaged with strap-fastener members 63. The cover overhangs 61 and the roll-fastener straps 28 are articulated for encompassing cooperatively and thereby containing the left-side panels 15, the right-side panels 16 and the back-end panel 17 selectively in panel rolls 72, one of which is shown in FIG. 7, with the overhang-fastener members 62 engaged with the strap-fastener members 63 respectively.

Referring to FIGS. 1–8, the back-end panel 17 includes an access flap 50 that is openable and closable for protective access to items 51 carried proximate a back of the golf cart 9. The access flap 50 is openable and closable with a double zipper 52 having two zipper closures for being opened and closed in opposite directions.

The access flap 50 is articulated for accessibleness of golf clubs 64 from a left golf bag 65 behind the left seat 55 by zippering and un-zippering a left side of the double zipper 52, for accessibleness of the golf clubs 64 from a right golf bag 66 behind the right seat 57 by zippering and un-zippering the double zipper 52, for accessibleness of golf-bag items that include golf balls from a left golf-bag pocket 67 by reaching through a left-pocket bay 68 proximate a left side of the access flap 50, for accessibleness of golf-bag items that include golf balls from a right golf-bag pocket 69 by reaching through a right-pocket bay 70 proximate a right side of the access flap 50, for accessibleness of the left golf bag 65 by fastening and unfastening a left flap fastener 22, and for accessibleness of the right golf bag 66 by fastening and unfastening a right flap fastener 23.

The left flap fastener 22 and the right flap fastener 23 can include Velcro® fastener strips positioned on adjacent edges of bottom portions of the back-end panel 17 and the access flap 50 for closing and opening of the access flap 50 below the double zipper 52, below the left pocket bay 68 and below the right pocket bay 70.

Bottom ends of predetermined left-side panels 15, right-side panels 16 and portions of the back-end panel 17 can include stiffener members 53, particularly for handling and anchoring under the back-end panel 17.

A left anchor flap 54 can be included on a bottom end of the left-back window panel 36. The left anchor flap 54 is articulated to fit under a left seat 55 for anchoring the left back window panel 36 in opposition to laterally rightward travel and to eliminate a need for marring attachment by snaps, hook and loop fastening material, hooks or other means to a back left side panel of the golf cart. Likewise, a right anchor flap 56 can be included on a bottom end of the right-back window panel 46 to fit under a right seat 57 for anchoring the cover 1 for the same reasons as in the left-back window panel 36.

The left door panel 33 and the right door panel 43 can include aft-edge zipper portions that are forwardly slanted predeterminedly.

Embodiments of this invention can include anchoring of the over-the-top cover 1 against travel horizontally by a combination of transverse engagement of the windshield-overhang pocket 2 with the windshield top 10 of the golf cart 9, back attachment of the over-the-top cover 1 to a back-left-post top 11 with left back straps 12, back attachment of the over-the-top cover 1 to a back right-post top 13 with right back straps 14 and with optionally anchoring of the left anchor flap 54 of a left-side panel 15 under the left seat 55 and anchoring of the right anchor flap 56 of a right-side panel 16 under the right seat 57.

A new and useful soft-cab seat-anchored golf-cart enclosure having been described, all such foreseeable modifications, adaptations, substitutions of equivalents, mathematical possibilities of combinations of parts, pluralities of parts, applications and forms thereof described by the following claims and not precluded by prior art, are included in this invention.

What is claimed is:

1. A soft-cab enclosure comprising:
   a left-back window panel fastened to a top left side of a vehicle;
   a left anchor flap on a bottom end of the left-back window panel;
   the left anchor flap being articulated to fit under a seat for anchoring the panel in opposition to laterally rightward travel;
   a right-back window panel fastened to a top right side of a vehicle;
   a right anchor flap on a bottom end of the right-back window panel;
   the right anchor flap being articulated to fit under a seat for anchoring the enclosure in opposition to laterally leftward travel;
   a cover having a windshield-overhang pocket on a cover front and back-post straps on a cover back proximate oppositely disposed back corners of the cover;
   the cover being articulated to fit linearly intermediate a cart-top front and a cart-top back and to fit laterally intermediate a left top side and a right top side of a cart top of a predetermined golf cart;
   the cover being anchored firmly against travel horizontally by a combination of transverse engagement of the windshield-overhang pocket with a windshield top of the golf cart, back attachment of the cover to a back-left-post top with left back straps and back attachment of the cover to a back right-post top with right back straps;

a plurality of left-side panels having side-panel tops affixed to the cover proximate the left top side of the cover;

a plurality of right-side panels having side-panel tops affixed to the over-the-top cover proximate the right top side of the over-the-top cover;

a back-end panel having a back-panel top affixed to the cart-top back of the over-the-top cover;

a left-front panel fastener affixable to a left-front post of the golf cart;

a right-front panel fastener affixable to a right-front post of the golf cart; and panel joiners intermediate adjacent edges of the left back window panel, intermediate adjacent edges of the right back window panel and adjacent edges of the back-end panel.

2. The soft-cab golf-cart enclosure of claim 1 wherein:
the panel joiners include hook fasteners.

3. The soft-cab golf-cart enclosure of claim 1 wherein:
the panel joiners include hook and loop fastening material.

4. The soft-cab golf-cart enclosure of claim 1 wherein:
the panel joiners include snaps.

5. The soft-cab golf-cart enclosure of claim 1 wherein:
the panel joiners include zippers.

6. The soft-cab golf-cart enclosure of claim 1 wherein:
the left-side panels, the right-side panels and the back-end panels are rollable up to, fastenable with, unfastenable from and unrollable down from roll-fastener straps proximate panel tops thereof selectively.

7. The soft-cab golf-cart enclosure of claim 1 wherein:
the left-side panels, the right-side panels and the back-end panel include tarpaulin bottoms intermediate bottom ends thereof and predeterminedly proximate cart-seat heights vertically above the bottom ends.

8. The soft-cab golf-cart enclosure of claim 1 wherein:
the left-side panels include a left-front-corner panel having a front-left-post side that is articulated for being fastened to the left-front post and having a left-door-panel side that is articulated for being fastened to a flexible and transparent left-door panel;

the left-side panels include the left-door panel having a left-corner-panel side that is articulated for being fastened to the left-front-corner panel and having a left-back-window side that is articulated for being fastened to the left-back window panel;

the left-back-window panel having a left-door-panel side that is articulated for being fastened to the left-door panel and having a left-back-panel side that is articulated for being fastened to a left-window side of the back-end panel;

the right-side panels include a right-front-corner panel having a front-right-post side that is articulated for being fastened to the right-front post and having a right-door-panel side that is articulated for being fastened to a right-door panel;

the right-side panels include the right-door panel having a right-corner-panel side that is articulated for being fastened to the right-front-corner panel and having a right-back-window side that is articulated for being fastened to a right-back-window panel; and the right-back-window panel having a right-door-panel side that is articulated for being fastened to the right-door panel and having a right-back-panel side that is articulated for being fastened to a right-window side of the back-end panel.

9. The soft-cab golf-cart enclosure of claim 8 wherein:
the left-side panels, the right-side panels and the back-end panel are rollable up to, fastenable with, unfastenable from and unrollable down from roll-fastener straps proximate panel tops thereof selectively.

10. The soft-cab golf-cart enclosure of claim 8 wherein:
the over-the-top cover includes cover overhangs proximate the left top side, proximate the right top side and proximate the cart-top back; and the cover overhangs are articulated to overhang top ends of the left-side panels, the right-side panels and the back-end panel.

11. The soft-cab golf-cart enclosure of claim 9 wherein:
the cover overhangs include overhang-fastener members which are articulated for being engaged with strap-fastener members;

the cover overhangs and the roll-fastener straps are articulated for encompassing cooperatively and thereby containing the left-side panels, the right-side panels and the back-end panel selectively in rolled-up modes thereof with the overhang-fastener members engaged with the strap-fastener members respectively.

12. The soft-cab golf-cart enclosure of claim 11 wherein:
the panel joiners include hook fasteners.

13. The soft-cab golf-cart enclosure of claim 11 wherein:
the panel joiners include hook and loop fastening material.

14. The soft-cab golf-cart enclosure of claim 11 wherein:
the panel joiners include snaps.

15. The soft-cab golf-cart enclosure of claim 11 wherein:
the panel joiners include zippers.

16. The soft-cab golf-cart enclosure of claim 15 wherein:
the panel joiners include hook fasteners.

17. The soft-cab golf-cart enclosure of claim 15 wherein:
the panel joiners include hook and loop fastening material.

18. The soft-cab golf-cart enclosure of claim 15 wherein:
the panel joiners include snaps.

19. The soft-cab golf-cart enclosure of claim 8 wherein:
the back-end panel includes an access flap that is openable and closable for protective access to items carried proximate a back of the golf cart.

20. The soft-cab golf-cart enclosure of claim 19 wherein:
the access flap is openable and closable with a double zipper having two zipper handles for being opened and closed in opposite directions.

21. The soft-cab golf-cart enclosure of claim 20 and further comprising:
hook and loop fastener strips positioned on adjacent edges of bottom portions of the back-end panel for closing and opening of the access flap predeterminedly below the double zipper.

22. The soft-cab golf-cart enclosure of claim 19 wherein:
the access flap is articulated for accessibleness of golf clubs from a left golf bag aft of the left seat by zippering and un-zippering a left side of the double zipper, for accessibleness of the golf clubs from a right golf bag aft of the right seat by zippering and un-zippering the double zipper, for accessibleness of golf-bag items from a left golf-bag pocket by reaching through a left-pocket bay proximate a left side of the access flap, for accessibleness of golf-bag items from a right golf-bag pocket by reaching through a right-pocket bay proximate a right side of the access flap, for accessibleness of the left golf bag by fastening and unfastening a left flap fastener, and for accessibleness of the right golf bag by fastening and unfastening a right flap fastener selectively.

23. The soft-cab golf-cart enclosure of claim 22 wherein:
the left flap fastener and the right flap fastener include the Velcro® fastener strips.

24. The soft-cab golf-cart enclosure of claim 8 and further comprising:
stiffener members on bottom ends of predetermined left-side panels, right-side panels and portions of the back-end panel.

25. The soft-cab enclosure of claim 8 wherein:
the left door panel and the right door panel include aft edges with top portions that are slanted forward predeterminedly.

26. A soft-cab golf-cart enclosure comprising:
a cover having a windshield-overhang pocket on a cover front and back-post straps on a cover back proximate oppositely disposed back corners of the over-the-top cover;
the cover being articulated to fit linearly intermediate a cart-top front and a cart-top back and to fit laterally intermediate a left top side and a right top side of a cart top of a predetermined golf cart;
the plurality of left-side panels having side-panel tops affixed to the left top side of the cover;
the plurality of left-side panels including a left-back window panel;
a left anchor flap on the bottom end of the left-back window panel;
the left anchor flap being articulated to fit under a seat for anchoring the over-the-top cover in opposition to laterally rightward travel;
the plurality of right-side panels having side-panel tops affixed to the right top side of the cover;
the plurality of right-side panels including a right-back window panel;
a right anchor flap on the bottom end of the right-back window panel;
the right anchor flap being articulated to fit under a seat for anchoring the over-the-top cover in opposition to laterally leftward travel;
a back-end panel having a back-panel top affixed to the cart-top back of the cover;
a left-front panel fastener affixable to a left-front post of the golf cart;
a right-front panel fastener affixable to a right-front post of the golf cart; and
panel joiners intermediate adjacent edges of the left-back window panels, intermediate adjacent edges of the right-back panels and adjacent edges of the back-end panel.

27. The soft-cab enclosure of claim 26 wherein:
the cover is anchored firmly against travel horizontally by a combination of transverse engagement of the windshield-overhang pocket with a windshield top of the golf cart, back attachment of the cover to a back-left-post top with left back straps, back attachment of the cover to a back right-post top with right back straps, anchoring the left anchor flap under the left seat and anchoring of the right anchor flap under the seat.

28. The soft-cab enclosure of claim 26 wherein:
the left-side panels, the right-side panels and the back-end panel include tarpaulin bottoms intermediate bottom ends thereof and predeterminedly proximate cart-seat heights vertically above the bottom ends.

29. The soft-cab golf-cart enclosure of claim 27 wherein:
the back-end panel includes an access flap that is openable and closable for protective access to items carried proximate a back of the golf cart.

30. The soft-cab enclosure of claim 29 wherein:
the access flap is openable and closable with a double zipper having two zipper handles for being opened and closed in opposite directions.

31. The soft-cab enclosure of claim 30 and further comprising:
hook and loop fastener strips positioned on adjacent edges of bottom portions of the back-end panel for closing and opening of the access flap below the double zipper.

32. The soft-cab enclosure of claim 30 wherein:
the access flap is articulated for accessibleness of golf clubs from a left golf bag aft of the left seat by zippering and un-zippering the left side of the double zipper, for accessibleness of the golf clubs from the right golf bag aft of the right seat by zippering and un-zippering the double zipper, for accessibleness of golf-bag items from a left golf-bag pocket by reaching through a left-pocket bay proximate the left side of the access flap, for accessibleness of golf-bag items from the right golf-bag pocket by reaching through the right-pocket bay proximate the right side of the access flap, for accessibleness of the left golf bag by fastening and unfastening the left flap fastener, and for accessibleness of the right golf bag by fastening and unfastening the right flap fastener.

33. The soft-cab enclosure of claim 32 wherein:
the left flap fastener and the right flap fastener include hook and loop fastener strips.

34. The soft-cab enclosure of claim 26 wherein:
the cover being anchored firmly against travel horizontally by a combination of transverse engagement of the windshield-overhang pocket with a windshield top of the golf cart, back attachment of the cover to a back-left-post top with left back straps, back attachment of the cover to a back right-post top with right back straps, anchoring of the left anchor flap of the left-back panel under the seat and anchoring of the right anchor flap of the right-back window panel under the seat.

* * * * *